INVENTOR.
KENNETH E. NELSON
BY David E. Hoppe
ATTORNEY

INVENTOR.
KENNETH E. NELSON
BY David E. Hoppe
ATTORNEY

United States Patent Office 3,426,287
Patented Feb. 4, 1969

3,426,287

CONTROL AMPLIFIER ADAPTED FOR INTEGRATION OF AN INPUT SIGNAL TO A TRANSLATED OUTPUT SIGNAL

Kenneth E. Nelson, North Attleboro, Mass., assignor to The Foxboro Company, Foxboro, Mass., a corporation of Massachusetts Filed May 17, 1967, Ser. No. 639,241
U.S. Cl. 330—13 10 Claims
Int. Cl. H03f 3/18

ABSTRACT OF THE DISCLOSURE

A control amplifier is adapted for use with a computer system interface for controlling output hardware; the amplifier features a special low-leakage input circuit with tracking feedback and output circuits facilitating operation within specifications for linearity, integration error, stability and drift.

This invention relates to amplifiers generally, and in particular to control amplifiers adapted for interfacing between a computer output and controlled hardware devices such as process valves and the like.

For a control amplifier to fulfill the specifications for a valve control application, it must have exceptionally good stability, and perform integration of incremental input signals with good linearity and exhibit especially low drift during the interval the input is disabled. The amplifier must be able to unwind from integrator wind-up in a very short time interval, and must not be subject to input offset variations.

The present invention provides an amplifier especially suited for a control amplifier interface application, the disclosed embodiment having requisite stability and linearity for the application of process valve control while exhibiting a drift rate of less than 1% per hour. This slow drift rate is especially important in process valve control, in that the plant valves must be maintained at setting in the event no signals are provided from the computer, and in the event of system failure wherein the control amplifier automatically goes to battery back-up. By such a drift specification, the interval is defined for which a disabling control system malfunction must be repaired. Sufficient time must be allowed for either, repair of all possible malfunctions, or for effecting a plant shut-down with minimum wastage.

Briefly stated, the invention provides a control amplifier having auxiliary inputs for amplifier selection and selection of integration direction, employing a field effect transistor responsive to a summing junction at the amplifier input, the summing junction being connected to the amplifier input through a leak-stopper circuit and also to a feedback stage through a special low-leakage capacitor; the span of the feedback stage tracks the span of the current output.

These and other objects of the invention will be in part apparent from the following specification and in part from the accompanying figures in which.

Figure 1:
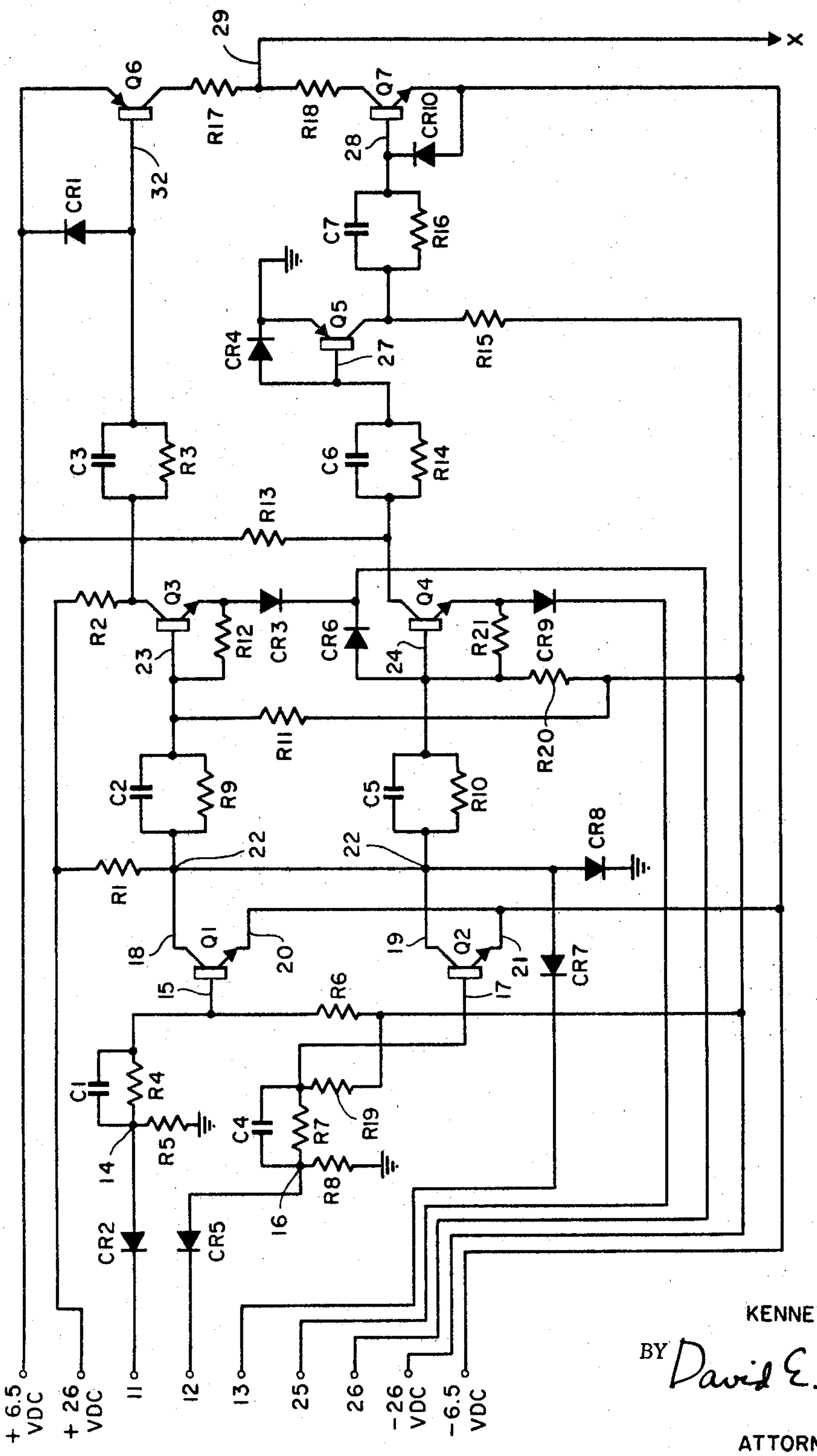
FIGURE 1 is a circuit schematic of the control amplifier bipolar drive circuit employing a logical AND gate enabling input.

Referring to FIGURE 1, AND gate enabling inputs 11 and 12 are provided, in order to facilitate application of the amplifier to the X and Y outputs of a matrix source (not shown), in which one co-ordinate is applied to each input 11 and 12, thereby specifying a particular control amplifier and its output hardware location. To facilitate this application, inputs 11 and 12 must both have enabling potentials supplied thereto for the control amplifier to receive a signal from the bipolar drive stages. Enabling signals at inputs 11 and 12 consist, in each case, of a minus 6.5 v. D.C. potential. An input 11 or 12 is inhibited when a zero or ground potential is supplied thereto, and consequently the control amplifier is not driven when either input 11 or 12, or both of them, are inhibited. In addition, a third unconditional inhibit input 13 is provided, which effectively inhibits the AND gate enabled by inputs 11 and 12 at times when a potential of minus 6.5 v. D.C. is supplied to inhibit input 13 although inputs 11 and 12 may both be enabled.

In more detail, input 11 is coupled through isolating diode CR2 to junction 14. Junction 14 has a resistance R5 connected to ground therefrom and in addition has a parallel combination of capacitor C1 and resistor R4 connected to base 15 of switching transistor Q1. Resistor R6 connects base 15 of transistor Q1 to a minus 26 v. D.C. potential. In a similar manner, input 12 is connected through isolating diode CR5 to junction 16 having a resistance R8 connected to ground therefrom, and having a parallel combination of capacitor C4 and resistor R7 connected to base 17 of transistor Q2. Resistor R19 connects base 17 to the minus 26 v. D.C. potential. The parallel combinations of resistor and capacitor at base 15 of transistor Q1 and base 17 of transistor Q2 each serve to effectively differentiate the leading edge of signal pulses appearing at inputs 11 and 12, and thereby speed up the effect of the input signals on bases 15 and 17 of transistors Q1 and Q2 respectively.

The collectors 18 and 19 of transistors Q1 and Q2 respectively are connected together, which common connection is designated point 22 for convenience in the description. Point 22 is coupled through resistor R1 to +26 v. D.C. The emitters 20 and 21 of transistors Q1 and Q2 respectively, are connected together and tied directly to −6.5 v. D.C. Inhibit input 13 is coupled through isolating diode CR7 to point 22. Diode CR8 clamps point 22 to ground when transistors Q1 and Q2 are both turned off.

Either a ground potential, or an open, at input 11 or 12 allows the associated input circuit R5, R4 and R6, or R8, R7 and R19, to effectively act as a voltage divider connected between ground and −26 v. D.C. The resistance values of R5, R4 and R6 for example, are chosen so that during the no-signal input condition at input 11 transistor Q1 will be forward-biased at its base-emitter junction; a potential of approximately −0.6 v. D.C. will be present at base 15 of transistor Q1 when it is forward-biased. Similarly, transistor Q2 is forward-biased when a zero input is at input 12.

When an enabling potential of −6.5 v. D.C. is supplied to either input 11 or 12, the respective junction 14 or 16 is consequently dropped below ground potential, and the resistor pair R4 and R6 or R7 and R19, supplies to its respective base 15 or 17 a potential more negative than the −6.5 v. D.C. supplied to the emitter. This condition reverse-biases the base-emitter junction, and the transistor is consequently cut off. When both inputs 11 and 12 are enabled by −6.5 v. D.C. supplied thereto, both transistors Q1 and Q2 will thereby be cut off. When both transistors Q1 and Q2 are cut off, no transistor current may then flow through resistor R1, and point 22 will then be at approximately +0.5 v. D.C., this potential being determined by the series configuration of clamp diode CR8 and resistor R1 which are between ground and +26 v. D.C., point 22 being at the junction of diode CR8 and resistor R1. A potential of approximately +0.5 v. D.C. at point 22 renders the bipolar drive circuits conditionally operative; a negative potential of approximately −6 D.C. disables the bipolar drive circuits. It may be noted that an unconditional inhibit signal of −6.5 v. D.C. supplied to inhibit input 13 will be coupled through isolating diode CR7 to point 22, thereby clamping point 22 to about −6.0 v. D.C. notwithstanding the condition of transistor Q1 or Q2.

When either input 12 or 11 is inhibited by a ground potential, and the respective transistor Q1 and Q2 is consequently turned on, point 22 is thereby pulled below ground towards the emitter −6.5 v. D.C. potential.

The enabling ground potential (+0.5 v. D.C.) at point 22 activates the bipolar drive circuits including transistors Q3 and Q4. Point 22 is coupled through the parallel combination of resistor R9 and capacitor C2 to base 23 of transistor Q3, and point 22 is also coupled through the parallel combination of C5 and R10 to base 24 of transistors Q4. The parallel combinations of resistor and capacitor in each case are pulse sharpeners, and act to speed up the effect of a signal appearing at point 22 upon base 23 and base 24 of respective transistor Q3 or Q4.

The polarity selection enabling signal is a −6.5 v. D.C. potential, which is applied to up input 25 or down input 26, according to the direction of amplifier integration selected. The polarity selection circuit is configured so that redundant enabling of up input 25 and down input 26 simultaneously by −6.5 v. D.C. signals results in the selection of the down drive circuit.

Down drive transistor Q3 has its collector coupled through resistor R2 to +26 v. D.C. Base 23 of down drive transistor Q3 is coupled through resistor R11 to −26 v. D.C. Base 23 is also coupled through resistor R12 to the emitter of down drive transistor Q3, and this emitter is coupled through isolating diode CR3 to down input 26.

The collector of up drive transistor Q4 is coupled through resistor R13 to +6.5 v. D.C. Base 24 of up drive transistor Q4 is coupled through resistor R20 to −26 v. D.C. Base 24 is also coupled through resistor R21 to the emitter of up drive transistor Q4, and this emitter is coupled through isolating diode CR9 to up input 25. Diode CR6 connects base 24 of up drive transistor Q4 to down input 26.

If a bipolar drive enabling potential of ground (+0.5 v. D.C.) appears at point 22, base 23 and base 24 of down drive transistors Q3 and up drive transistor Q4 respectively are thereby placed at a potential near ground, or slightly below; when base 23 and base 24 are so placed the provision of −6.5 v. D.C. at the up input 25 or down input 26 enables the corresponding up drive transistor Q4 or down drive transistor Q3 as the case may be.

An enabling signal at up input 25, coupled through diode CR9, lowers the emitter potential of Q4 sufficiently to forward-bias transistor Q4. When transistor Q4 is thereby turned on, the collector of Q4 drops to about ground potential. This ground potential is coupled through the parallel speed-up combination of capacitor C6 and resistor R14 to base 27 of inverting transistor Q5 turning Q5 on; the collector of Q5 thereupon rises to approximately the ground potential supplied to its emitter. The ground potential at the collector of Q5 is coupled through the parallel speed-up combination of capacitor C7 and resistor R16 to base 28 of transistor Q7, thereby enabling Q7. When transistor Q7 is enabled by a ground on its base 28 the −6.5 v. D.C. supplied to its emitter draws current through the collector circuit including protection resistor R18 and polarity selection line 29; thereby, approximately −6.5 v. D.C. appears at junction 30, connected to polarity selection line 29, signifying the up selection of amplifier integration. Junction 30 is connected to resistor 30, which has its other end grounded, and input terminal 31 of relay K1.

At times down input 26 has an enabling −6.5 v. D.C. signal supplied thereto, down drive transistor Q3 is forward-biased. It may be noted that a −6.5 v. D.C. at down input 26 has no effect via diode CR6 on base 24 of up drive transistor Q4 other than a tendency to reverse-bias transistor Q4. Should a coincident −6.5 v. D.C. enabling signal appear at up input 25, the base-emitter of up drive transistor Q4 will remain reverse-biased, thereby permitting down drive transistor Q3 only to be selected in the redundant enabling input situation, with −6.5 v. D.C. supplied to both up input 25 and down input 26.

In the condition of forward-bias of the base-emitter of down drive transistor Q3, the collector potential of down drive transistor Q3 is reduced to slightly below ground. This reduced collector potential is coupled through the parallel combination of speed-up resistor R3 and capacitor C3 to base 32 of transistor Q6. This signal at base 32 operates to forward-bias transistor Q6, which then draws current through its collector circuits including protection resistor R17 and polarity selection line 29 from its +6.5 v. D.C. emitter supply potential.

In the condition of forward-bias of transistor Q6 +6.5 v. D.C. appears at junction 30, signifying the down selection of amplifier integration.

Bipolar drive transistor Q6 and Q7 are of complementary types, with emitters tied to positive and negative potentials respectively, so that forward biasing of either transfers its emitter potential to junction 30. Protection resistors R17 and R18 are in series with the respective collectors of transistors Q6 and Q7, preventing a short circuit between −6.5 v. D.C. and +6.5 v. D.C. should both transistors Q6 and Q7 be turned on simultaneously by switching transients, or during switchover of polarity selection.

Diode CR4 protects the base-emitter junction of transistor Q5, diode CR1 protects the base-emitter junction of diode Q6, and diode CR10 protects the base-emitter junction transistor Q7, in each case against reverse breakdown.

The switching and bipolar drive circuitry above described is designed so that if any transistor therein becomes shorted, there will be no adverse effect upon any supply potential or signal connected to the circuit. This is advantageous in that these supply potentials and signals may be energizing other control amplifiers or circuits; the malfunction of one amplifier from a transistor short will not then knock out other amplifiers by way of supply or signal shorting.

Figure 2:
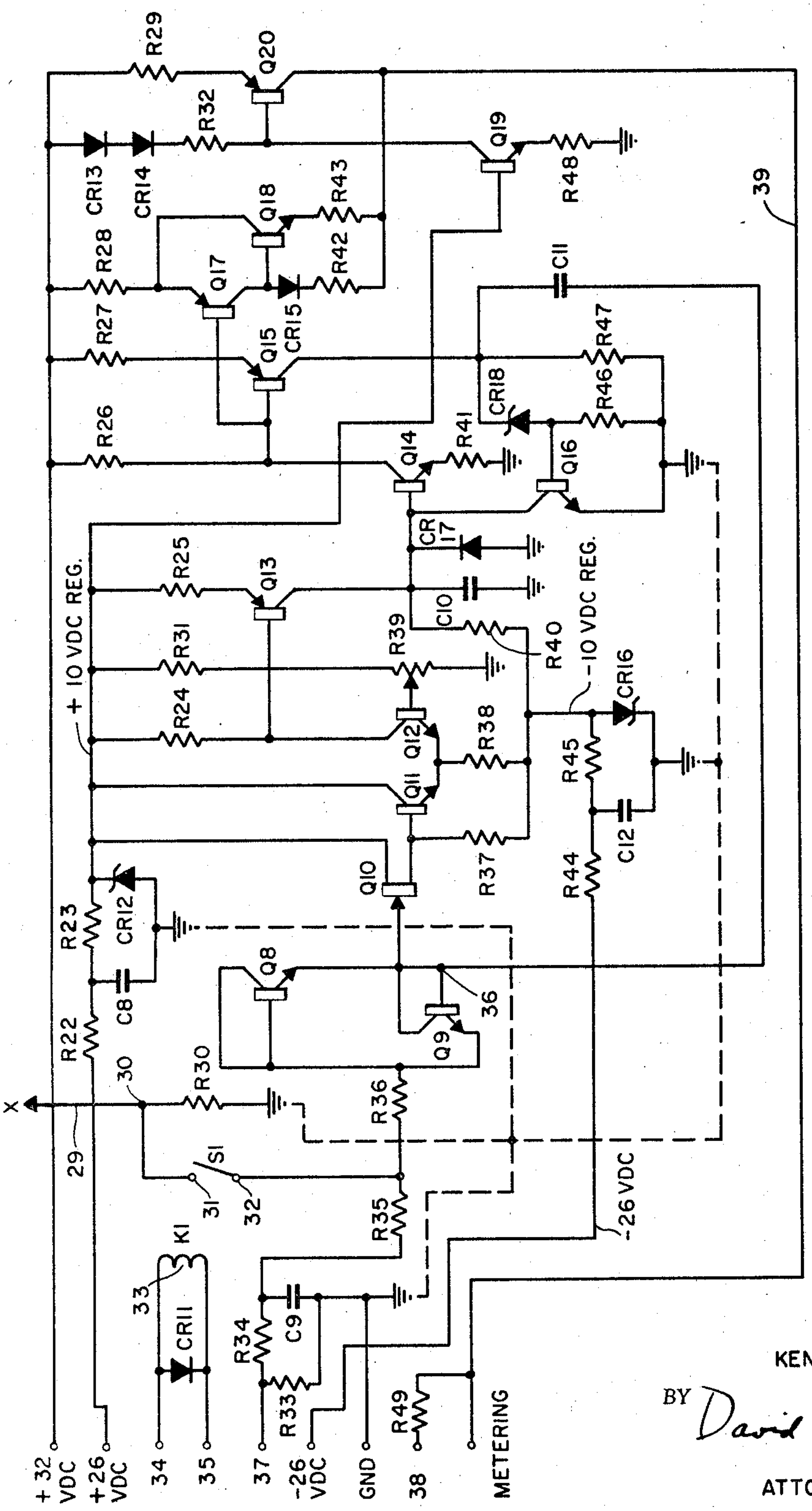
FIGURE 2 is a circuit schematic of the control amplifier.

Referring to FIGURE 2, the above circuitry thereby supplies to junction 30, to which is connected terminal 31 of relay K1 and resistor R30, a signal of pulse or minus 6.5 v. D.C., according to the selected polarity, a plus potential ordering down integration and a negative potential ordering integration up, this being the proper arrangement with an inverting amplifier, as is herein described. The duration of the selected potential at junction 30, negative or positive as the case may be, is an interval determined by the duration of both enabling signals that are simultaneously supplied to inputs 11 and 12 of the AND gate consisting of transistors Q1 and Q2.

Relay K1 performs the computer-manual selection, being in the computer mode when energized, whereby relay input terminal 31 is connected to terminal 32 of relay K1. Relay K1 is energized by coil 33 when a −48 v. D.C. relay signal is supplied to terminal 34; the other end of coil 33 is connected to interlock terminal 35. Diode CR11 across coil 33 suppresses inductive kickback when coil 33 is de-energized.

Amplifier input resistor R36 is connected from terminal 32 of relay K1 through transistors Q8 and Q9, connected as anti-parallel leak-stopper diodes, to summing junction 36. If K1 is energized, the control amplifier being then in the computer mode of operation, the combination of resistor R30, which is between junction 30 and ground, and amplifier input resistor 36 regulates the magnitude of the current to summing junction 36, which current is equal to the charging and discharge current, as the case may be, of the low-leakage capacitor tied to summing junction 36. The magnitude of the current passing through summing junction 36 regulates the rate of control amplifier integration, that is to say, rate of change of amplifier output current.

To summing junction 36 is connected the antiparallel leak stoppers Q8 and 89, low-leakage capacitor C11, and the gate of field-effect transistor Q10. The gate leakage of field-effect transistor Q10 is less than 1.0 picoampere with 20 volts gate reverse-bias at 25° C. The antiparallel leak stoppers Q8 and 89 are connected so as to employ their base-emitter junctions, which exhibit less than 3 picoamperes current at 25° C. with 50 millivolts forward voltage. At times no input signal is present, the amplifier leakage at summing junction 36 is very low; the effective impedance at summing junction 36 at 25° C. is about 17,000 megohms, while at 55° C., the leakage current may increase by a factor of about 8 to give about 2,000 megohms effective impedance.

Manual input 37 may be employed when relay K1 is de-energized. The signal supplied to manual input 37 is positive for a desired down direction of control amplifier operation, and negative for an up direction. The signal level supplied to input 37 is to be varied through a range of 0 to 6.5 v. D.C., according to the slewing rate desired. Illustratively, a potential of 0.5 v. D.C. applied to input 37 will give a full span slewing rate of 200 seconds, while a potential of 6.5 v. D.C. applied to input 37 gives a full span slewing rate of 5.0 seconds.

Manual input 37 is terminated by resistor R33, connecting input 37 to ground. Manual input is coupled through a high impedance filter to the junction of terminal 32 of relay K1 and amplifier input resistor R36. The high impedance filter consists of resistors R34 and R35 with capacitor C9 connecting the junction of R34 and R35 to ground.

The filter resistors R34 and R35 are approximately 1.5 megohms together in their serial configuration, with the values being calculated to pass on to summing junction 36 a current producing control amplifier slewing at the desired rates.

When relay K1 is energized, relatively low impedance R30 thereby connects the junction of amplifier input resistor 36 and terminal 32 to ground, and any manual slewing is effectively attenuated by filter resistors R34 and R35, so as to become negligible.

Summing junction 36 is connected to the gate of field-effect transistor Q10, and to one side of low-leakage capacitor C11, which performs the feedback-integration and storage functions. The drain of field-effect transistor Q10 is connected to a regulated and filtered +10 v. D.C. and the source is connected through resistor R37 to a regulated and filtered −10 v. D.C. The output of field-effect transistor Q10 is taken from its source and directly connected to the base of transistor Q11. Transistors Q11 and Q12 together form a differential amplifier, the base of transistor Q12 being adjusted by potentiometer R39 according to the particular pinch-off voltage exhibited by the field-effect transistor selected; the adjustment of potentiometer 39 is correct when a 30 milliampere mid-scale current output is obtained from the control amplifier with summing junction 36 shorted to ground. The emitters of Q11 and Q12 are tied together and connected through resistor R38 to the regulated −10 v. D.C. Transistors Q11 and Q12 may be mismatched to a certain extent, but any unbalance of output occurring therefrom is minimal compared to unbalances that must be compensated by potentiometer R39. The output of differential amplifier Q11 and Q12 is taken from collector of transistor Q12, which is tied to +10 v. D.C. through resistor R24. The output from the collector of transistor Q12 is directly connected to the base of transistor Q13, which refers the differential amplifier output to the ground reference, the collector of transistor Q13 being coupled through resistor R40 to the −10 volt regulated supply. The ground-referenced output of transistor Q13 is taken from its collector and connected directly to the base of transistor Q14. Transistor Q14 drives the feedback and output sections with a voltage gain of about 6. The base-emitter junction of transistor Q14 is protected from reverse breakdown by diode CR17.

Capacitor C10, connected between the base of transistor Q14 and ground, provides high-frequency compensation for the amplifier, to preserve closed-loop stability. By this means, the amplifier gain drops below unity before a 180° phase-reversal is achieved with increasing frequency. The connector of transistor Q14 drives the base of transistor Q15 and the base of transistor Q17, each having low resistance emitter resistors to facilitate proportional tracking. Transistor Q15 drives current through a 2,000 ohm load connected to ground, which current produces a nominal 18.6 volt feedback voltage span. Transistor Q17 drives the base of output amplifier Q18, which has a current gain of 4 providing a nominal 46 milliampere output current span. Transistor Q17 supplies one-fifth of the output current from its collector, through temperature-compensation diode CR15 and through resistor 42 to the output line 39, while transistor Q18 supplies four-fifths of the output current from its emitter through resistor R43 to output line 39. The total output current to line 39 from output transistors Q17 and Q18 has a span of 0 to 46 milliamperes. This current division between transistors Q17 and Q18 determines operating parameters for transistor Q17 which match the tracking of transistor Q17 to feedback transistor Q15. Thereby, transistors Q17 and Q15 operate at similar collector current levels, with similar base-emitter voltage drops, and with similar power dissipation for good characteristics of proportional tracking. The specified current output on line 39 will drive a 150–400 ohm load resistance at output terminal 38 via low resistance series metering resistor R49, which provides for metering of the output current as desired.

Current source transistor Q20 has its emitter tied through resistor R29 to +32 v. D.C., and its collector through resistor R49 to output terminal 38. The base is connected through a temperature compensation control series circuit of resistor R32 and diodes CR13 and CR14, to +32 v. D.C. The base of transistor Q20 is also connected through the collector-emitter path of regulating transistor Q19 and through R48 to ground. Transistor Q20 provides a temperature compensated 8.5 milliampere current source, from its collector, which is connected to output line 39. The emitter of current source Q20 is coupled through resistor R29 to +32 v. D.C. The 8.5 milliampere constant current from the collector of transistor Q20 elevates the output current span furnished by output transistors Q17 and Q18 by this amount. Thereby, the total output current may be varied between approximately 8.5 milliamperes minimum to 54.5 milliamperes maximum. The design limits of a current span of 10–50 milliamperes D.C. for the control amplifier thereby fall within this range. No adjustments are to be normally required other than the midscale setting of 30 milliamperes for a no-signal condition, made by balance potentiometer R39.

Load resistance R47 of transistor Q15 is the feedback load, with low-leakage capacitor C11 connected to the junction of resistor R47 and the collector of feedback transistor Q15.

Capacitor C11 is specified to be especially low-leakage so that the level of output current which has been integrated by previous input signals will remain, in accordance with the charge on capacitor C11, until the amplifier is again integrated by an input signal, with a minimal amount of drift characterizing the steady-state no-signal condition of the control amplifier.

The charge on capacitor C11 controls the precise voltage of summing junction 36, which over the output span will have a nominal variation of 4 millivolts. When the amplifier is not being actuated or integrated, summing junction 36 will remain at its last set millivolt level, not being subject to appreciable leakage through the gate of transistor Q10, or other capacitor C11, or through antiparallel leak stoppers C8 and C9. It is calculated that the drift of this arrangement, will be less than 1% per hour under the worst anticipated conditions of operation.

Transistor Q16 performs a protective function, operating to prevent the output of the control amplifier from overranging. The emitter of transistor Q16 is grounded, and its collector is directly coupled to the base of transistor Q14. When an overrange occurs, the output potential at the collector of transistor Q15 will exceed the 18.6 v. D.C. voltage span. Zener diode CR18 is effectively connected across feedback load resistor R47, and is selected in conjunction with resistor R46, with which it is in series, to break down upon a predetermined overrange. When Zener CR18 breaks down the overrange potential at the collector of transistor Q15 is coupled through Zener diode CR18 to the base of transistor Q16, thereby forward-biasing it. Thereby, the base of transistor Q14 is clamped to ground and the variable current output is cut back.

The control amplifier described above will recover almost completely from so-called "integrator wind-up" in about 0.5 second. The next application of input signal after the 0.5 second interval has elapsed will bring the output of the control amplifier within its normal working span. Integrator wind-up can occur when an input signal is applied over a sustained period of time so that the control amplifier effectively saturates, as a consequence of capacitor C11 being excessively charged by input current to summing junction 36. Summing junction 36 thereby exhibits a relatively major deviation from its normal working potentials, which are in the range of plus or minus 30 millivolts. When the input signal causing integrator wind-up is at last removed, the abnormal potential from capacitor C11 appearing at summing junction 36 will tend to discharge relatively quickly through antiparallel leak stoppers Q8 and Q9. Even if the control amplifier is the manual mode, the discharge through the filter, consisting of resistors R34 and R35, and termination resistor R33 to ground will be effected substantially within a half second, so that the summing junction will then find itself at a potential not far outside the normal span of the control amplifier. The recovery period of one-half second allows the control amplifier to satisfactorily re-establish itself for proper input signal activation and integration before the next anticipated signal input in most applications, such as in multiplexed valve control applications.

The field-effect transistor to be used in the control amplifier must exhibit low offset voltage with temperature change. A low offset voltage insures the preservation of the low drift characteristics of the control amplifier. It has been found that the characteristic of low offset voltage with temperature is most important in this application in order to insure that leak-stoppers Q8 and Q9 are not forward-biased into a region of excessively high conductance, which condition would increase the control amplifier drift rate.

Zener diodes CR12 and CR16 in the +10 v. D.C. regulator and the −10 v. D.C. regulator respectively both have positive temperature coefficients and operate in the designed circuit to tend to compensate the field-effect transistor voltage offset with temperature.

In addition, field-effect transistor offset is minimized by selecting drain resistor R37 to provide for a range of drain currents exhibiting a temperature effect that will tend to balance out the gate voltage offset resulting from temperature change.

Leak-stoppers Q8 and Q9 are transistor base-emitter junctions rather than conventional diodes, because of their exceptionally small forward currents at low forward bias voltages. Diodes commonly available are not suitable for this application.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A control amplifier adapted for integration of an input signal to a translated output signal with the level of said output signal corresponding to the summation of the successive increments of said input signal comprising;

- a field-effect transistor having a gate circuit responsive to a summing junction,
- a pair of leak-stopping means interconnected serially between the input to said control amplifier and said summing junction using the base-emitter junctions of transistors connected in an antiparallel diode configuration, and
- a low-leakage storage capacitor connected between said summing junction and a point in said control amplifier signal path following said field-effect transistor,
- whereby control amplifier integration is performed in response to an input signal coupled through said leak-stopping means with said control amplifier exhibiting a low drift of its output during the times said control amplifier is in a null-signal condition.

2. The control amplifier of claim 1, with a feedback transistor stage having its base circuit responsive to a point in the signal path in said control amplifier following the output of said field-effect transistor with said feedback transistor stage having an output supplying a feedback signal to said low leakage capacitor.

3. The control amplifier of claim 2, with a clamping transistor stage responsive to the output of said feedback transistor stage and said clamping transistor stage having an output clamping a point in the signal path of said control amplifier intermediate said field-effect transistor and said feedback transistor stage whereby an excessive feedback signal signifying amplifier overrange energizes said clamping transistor stage thereby clamping the signal level at said point intermediate said field-effect transistor stage and said feedback transistor stage which clamping prevents amplifier overranging and thereby effectively limits the maximum output current supplied from said control amplifier.

4. The control amplifier of claim 2 with a driving transistor stage having its base circuit responsive to the same said point said base circuit of said feedback transistor stage is responsive to the operating characteristics of said driving transistor stage being matched to the operating characteristics of said feedback transistor stage to provide for mutual performance characteristics therebetween exhibiting proportional tracking between said feedback transistor stage and said driving transistor stage, and

- a current output transistor stage being interconnected with said driving transistor stage whereby the current output of said control amplifier is supplied by said driving transistor stage and said current output transistor stage conjointly, the control amplifier current output span tracking the feedback transistor stage feedback signal span.

5. The control amplifier of claim 4 with temperature compensation means interconnected with said driving transistor stage and said current output transistor stage.

6. The control amplifier of claim 4 with a constant current source transistor stage in parallel with said output current transistor stage whereby the current output span of said control amplifier is elevated by the constant current output of said constant current source.

7. The control amplifier of claim 6 with temperature compensation means interconnected with said constant current source for maintaining the output current from said constant current source stable with temperature change.

8. The control amplifier of claim 4 with a differential amplifier having one input responsive to the output of said field-effect transistor and having the other input of said differential amplifier referenced to a preselected potential whereby the null-signal condition at said summing junction provides for a preselected level of output current from said control amplifier.

9. The control amplifier of claim 1 with a drain resistance for said field-effect transistor selected for an optimum balance of the offset temperature effect dependent upon drain current against the offset voltage temperature effect of said field-effect transistor thereby minimizing voltage offset of said field-effect transistor with temperature change, and with Zener-regulated supply potentials furnished to the drain and source circuits of said field-effect transistor in a manner whereby the positive temperature-coefficient temperature effect of said Zeners tends to compensate the temperature effect exhibited by said field-effect transistor whereby offset voltage variations of said field-effect transistor is minimized with temperature change.

10. The control amplifier of claim 1 with a complementary-transistor bipolar drive circuit supplying an input signal to said input of said control amplifier with said bipolar drive circuit designed to impress no adverse effect upon signal levels and supply potential furnished thereto in the event of a transistor within said bipolar drive circuit being shorted.

References Cited

UNITED STATES PATENTS 3,210,573 10/1965 Cooke-Yarborough et al. 307—229

ROY LAKE, *Primary Examiner.*

JAMES B. MULLINS, *Assistant Examiner.*

U.S. Cl. X.R.

330—17, 23, 24, 26, 35, 30